L. A. WARD AND W. D. CHASE.
LICENSE TAG FOR VEHICLES.
APPLICATION FILED APR. 7, 1916.
1,303,834.
Patented May 13, 1919.
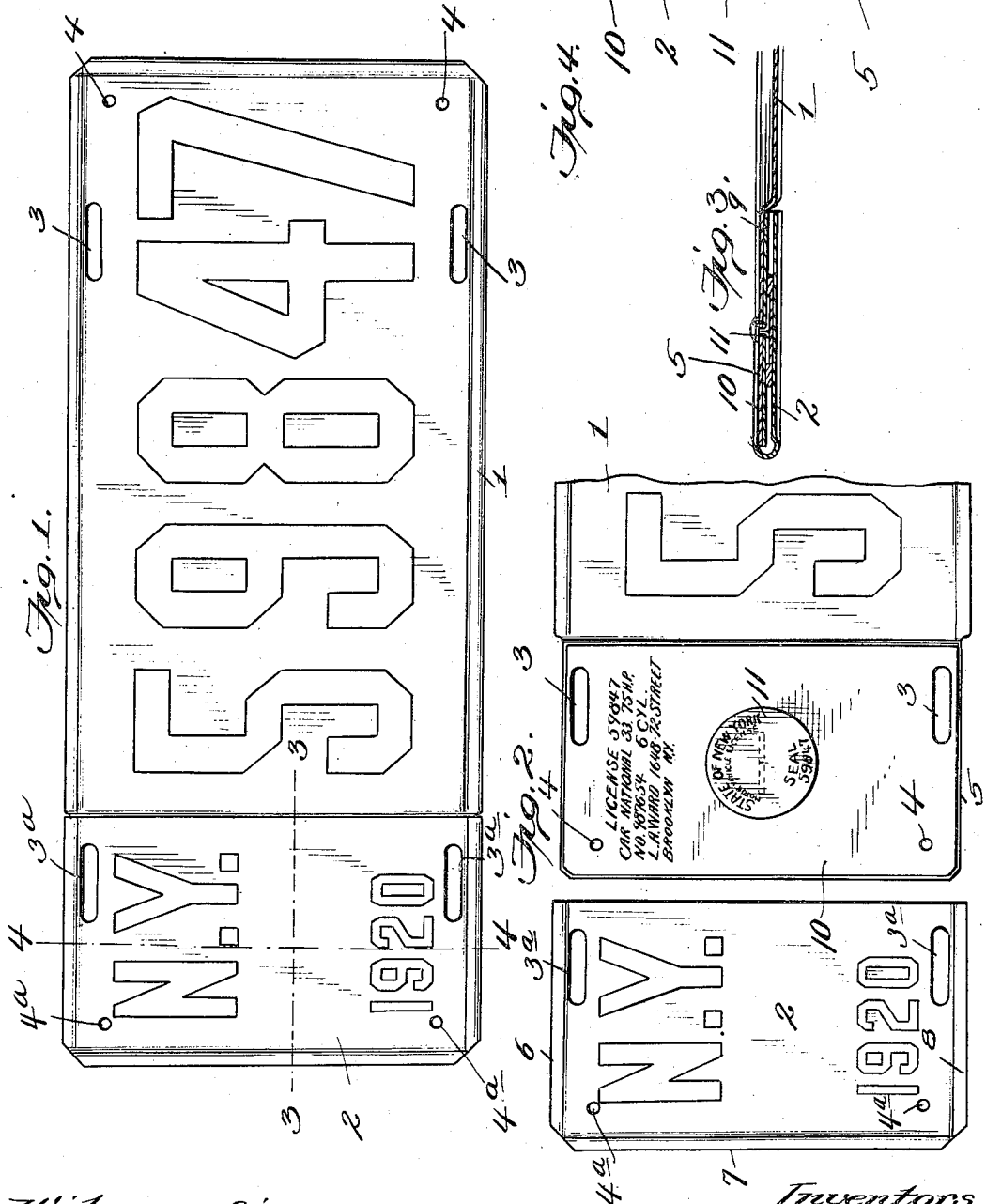

UNITED STATES PATENT OFFICE.

LYNFORD A. WARD AND WILLIAM D. CHASE, OF BROOKLYN, NEW YORK.

LICENSE-TAG FOR VEHICLES.

1,303,834. Specification of Letters Patent. Patented May 13, 1919.

Application filed April 7, 1916. Serial No. 89,674.

*To all whom it may concern:*

Be it known that we, LYNFORD A. WARD and WILLIAM D. CHASE, citizens of the United States, residing at Brooklyn, in the county of Kings and State of New York, have invented new and useful Improvements in License-Tags for Vehicles, of which the following is a specification.

Our present invention relates to improvements in license tags for automobiles, and the primary object of the invention is to provide a device of this character which will embody permanent identification means for the particular car to which said identification means was assigned, and a periodical identification means which may be associated with the permanent identification means as required by the renewal of the license.

In the preferred embodiment of the invention, the tag comprises a main or base plate bearing the serial identification number which is permanently assigned to the automobile, and a renewable plate or member detachably associated with the main or base plate and bearing means indicating a renewal of the license for each period of renewal. Also, if desired, a personal identification card may be held and sealed relatively to the main or base plate, the renewable plate or member then serving as a cover therefor and rendering the identification card visible or accessible by removing or shifting the renewable plate or member.

To these and other ends, the invention consists in certain improvements, and combinations and arrangements of parts, all as will be hereinafter more fully described, the novel features being pointed out particularly in the claim at the end of the specification.

In the accompanying drawing:—

Figure 1 shows the license tag in condition for use upon an automobile or other vehicle.

Fig. 2 shows the left-hand end of the tag with the renewable or auxiliary identification member removed therefrom and the personal identification card exposed.

Figs. 3 and 4 represent sections on the lines 3—3 and 4—4 respectively, of Fig. 1.

Similar parts are designated by the same reference characters in the several views.

License or identification tags embodying the present invention are applicable generally to vehicles of various kinds and to various uses where it is desirable to secure identification of the character provided for by the present invention. They are especially adapted for use, however, in connection with automobiles, wherein it is desirable or necessary to permanently identify each vehicle to which a license tag has been assigned, to identify the State or jurisdiction which issued the license, as well as the fact as to whether license for that particular vehicle has been renewed for the period the vehicle is used, and if desired, to permanently identify the individual to whom the license was issued or the renewal granted. The preferred embodiment of the invention is shown in the accompanying drawing and will be hereinafter described in detail, but it is to be understood that the invention is not restricted to the particular construction shown, as equivalent constructions within the scope of the annexed claim are contemplated and will be included as within the invention.

In the present instance, the device comprises a main or base plate 1 and an auxiliary detachable or renewable plate or member 2, the main or base plate being adapted for attachment to the vehicle to be identified, for which purpose it may have slots 3 or perforations 4 to receive straps, screws or the like, and the member 2 is detachably or renewably associated with the main or base plate. Preferably, and as shown, the main or base plate bears the serial identification number which is assigned permanently to the particular vehicle upon which the license tag is to be used, the face of the plate and the identification number thereof being of any desired color or colors, and preferably these colors are distinctive of the State or jurisdiction issuing the license tag; while the member 2 bears initials or other means to indicate the State or jurisdiction issuing the renewal, and a date indicating the period for which the renewal has been issued. Preferably, the face of the member 2 is of a color selected to indicate the renewal period for which it is issued, and by selecting a different color for each renewal period, any attempt to use the license tag without renewal will be readily detected.

The member 2 may be located in any desired position relatively to the main or base plate, and different means may be provided for detachably or renewably associating the same therewith. As shown, the left-hand end of the main or base plate is provided with a tongue or extension 5 which is preferably formed integrally with the base plate and, preferably, offset from the plane of the face thereof, and the member 2 is formed as a plate having its edges 6, 7 and 8 doubled or curved back, the upper and lower doubled or curved edges 6 and 8 being slidable endwise on the upper and lower edges of the tongue or extension in applying and removing the member 2 relatively to the base plate, and the doubled or curved edge 7 of the member 2 abutting against the end of the tongue or extension 5, thereby limiting the movement of the member 2 as the latter is applied to the base plate.

The member 2 is preferably provided with slots $3^a$ or perforations $4^a$ to register with the slots or perforations 3 or 4 respectively, in the tongue or extension 5 when the member 2 is applied to the base plate, thereby enabling the attaching means for the tag to be applied, and when such attaching means are applied, the same serve to retain the member 2 in proper relation to the base plate.

A flat pocket 9 is formed between the offset tongue or extension 5 and the member 2, and this pocket may be utilized to accommodate a personal identification card. As shown, a card 10 is inclosed in the pocket and it is held and sealed relatively to the base plate by the fastening and seal 11 which will prevent unauthorized substitution of another personal identification card. This personal identification card bears data to identify the vehicle to which the identification number borne by the base plate was permanantly assigned and to identify the individual to whom the original license or the renewal thereof was issued. The identification card is ordinarily inclosed and protected by the member 2 but is easily exposed or rendered accessible by shifting or removing this member.

A license tag embodying the present invention is especially adapted for use where a serial identification number is permanently assigned in the first instance to each vehicle, each vehicle, according to such arrangement, being always identified by the serial number on the base plate, although the vehicle may be sold or transferred to other persons. To insure the permanent use of the tag bearing the original permanent identification number, a higher fee may be charged by the State or jurisdiction for the issuance of a subsequent license tag for a vehicle to which an identification number has been previously assigned. The detachable or renewable member is the only part of the license tag which will require a change for each yearly or periodical renewal of the license, it being understood that whoever owns the vehicle at the time may renew the license by paying the requisite fee and filling out the official blank necessary for the purpose.

We claim as our invention:—

In a license tag for automobiles and the like, the combination of a base member bearing the automobile identification number, a member removably attached thereto bearing the date or period of renewal of the license, and means for holding and sealing a license owner's identification card between the said two members.

In testimony whereof we have hereunto set our hands in presence of two subscribing witnesses.

LYNFORD A. WARD.
WILLIAM D. CHASE.

Witnesses:
HERBERT E. TAYLOR,
HENRY BRUNRY.